(12) United States Patent
Gonzaga

(10) Patent No.: US 7,497,761 B2
(45) Date of Patent: Mar. 3, 2009

(54) TOOL FOR AUTOMATICALLY ASSEMBLING-DISASSEMBLING A TIRE TO/FROM A WHEEL RIM

(75) Inventor: Tullio Gonzaga, Correggio (IT)

(73) Assignee: Butler Engineering & Marketing SpA, Rio Saliceto (IT)

( * ) Notice: Subject to any disclaimer, the term of this patent is extended or adjusted under 35 U.S.C. 154(b) by 57 days.

(21) Appl. No.: 11/386,517

(22) Filed: Mar. 22, 2006

(65) Prior Publication Data
US 2006/0254725 A1 Nov. 16, 2006

(30) Foreign Application Priority Data
Mar. 23, 2005 (IT) .......................... VR2005A0037

(51) Int. Cl.
 *B60C 25/135* (2006.01)
(52) U.S. Cl. ........................................ 451/1.17; 451/14
(58) Field of Classification Search ....... 157/1.22–1.24, 157/1.17, 1.26, 14
See application file for complete search history.

(56) References Cited

U.S. PATENT DOCUMENTS

| 6,629,554 | B2 * | 10/2003 | Mimura ..................... 157/1.24 |
| 7,108,036 | B2 * | 9/2006 | Spaggiari ................... 157/1.24 |
| 2003/0094244 | A1 | 5/2003 | Gonzaga |
| 2004/0055712 | A1 | 3/2004 | Corghi |
| 2005/0247409 | A1 | 11/2005 | Corghi |

\* cited by examiner

*Primary Examiner*—Jacob K. Ackun, Jr.
(74) *Attorney, Agent, or Firm*—Orum & Roth LLC

(57) ABSTRACT

The present invention relates to a tire assembling-disassembling tool for use in a tire assembling-disassembling machine arranged to rotatable support a tired wheel or wheel rim, said tool being cantilever supported on a respective guide member of the tire assembling-disassembling machine, said tool extending parallel to the axis of rotation of the wheel and comprising a tool-carrying arm slidable mounted on said guide member, and at least one nail-shaped member having a first end thereof constrained to said supporting arm so to be able to made roto-translational movements with respect thereto, and the other free end hook-shaped with back facing said wheel rim.

14 Claims, 4 Drawing Sheets

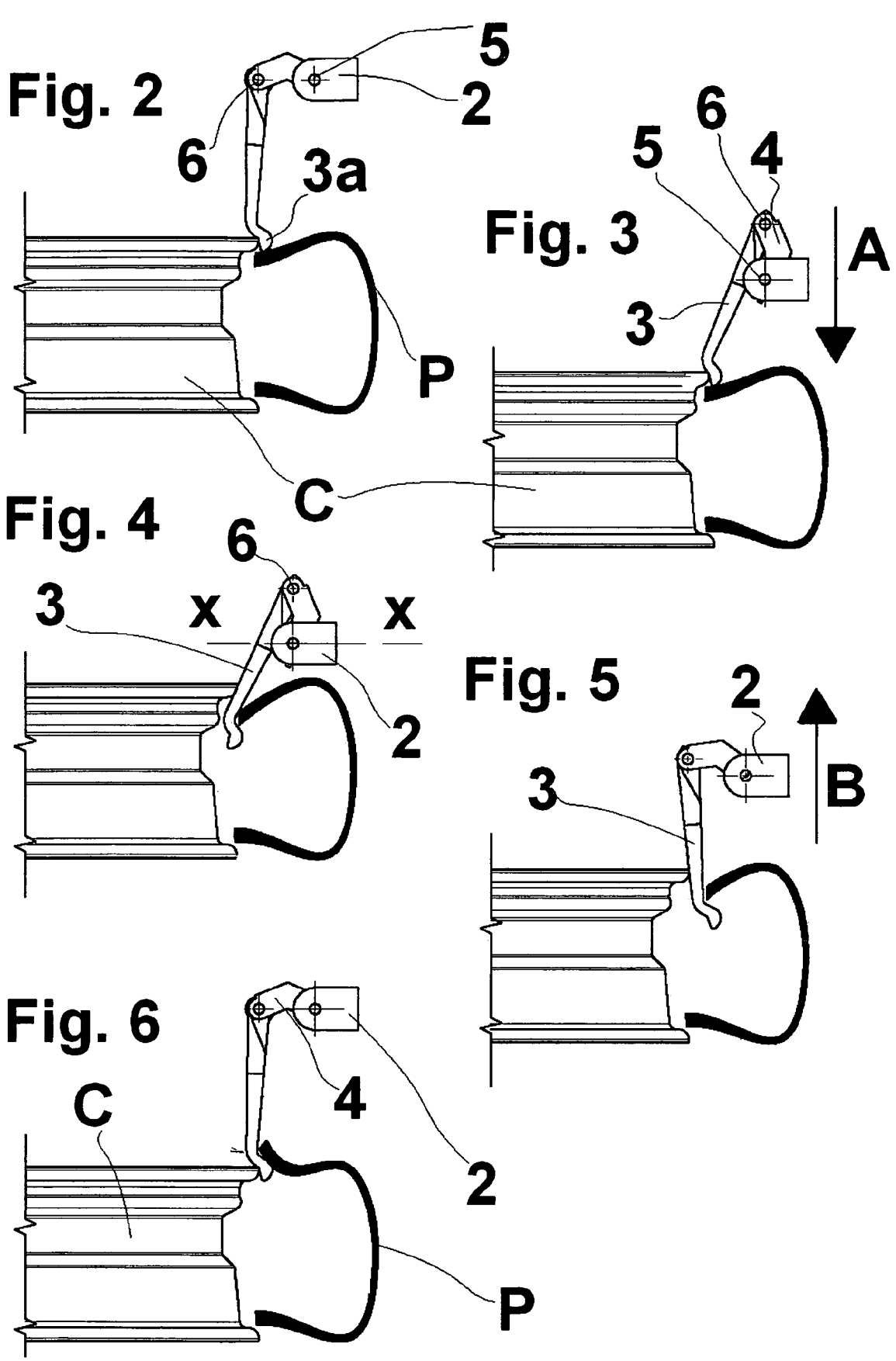

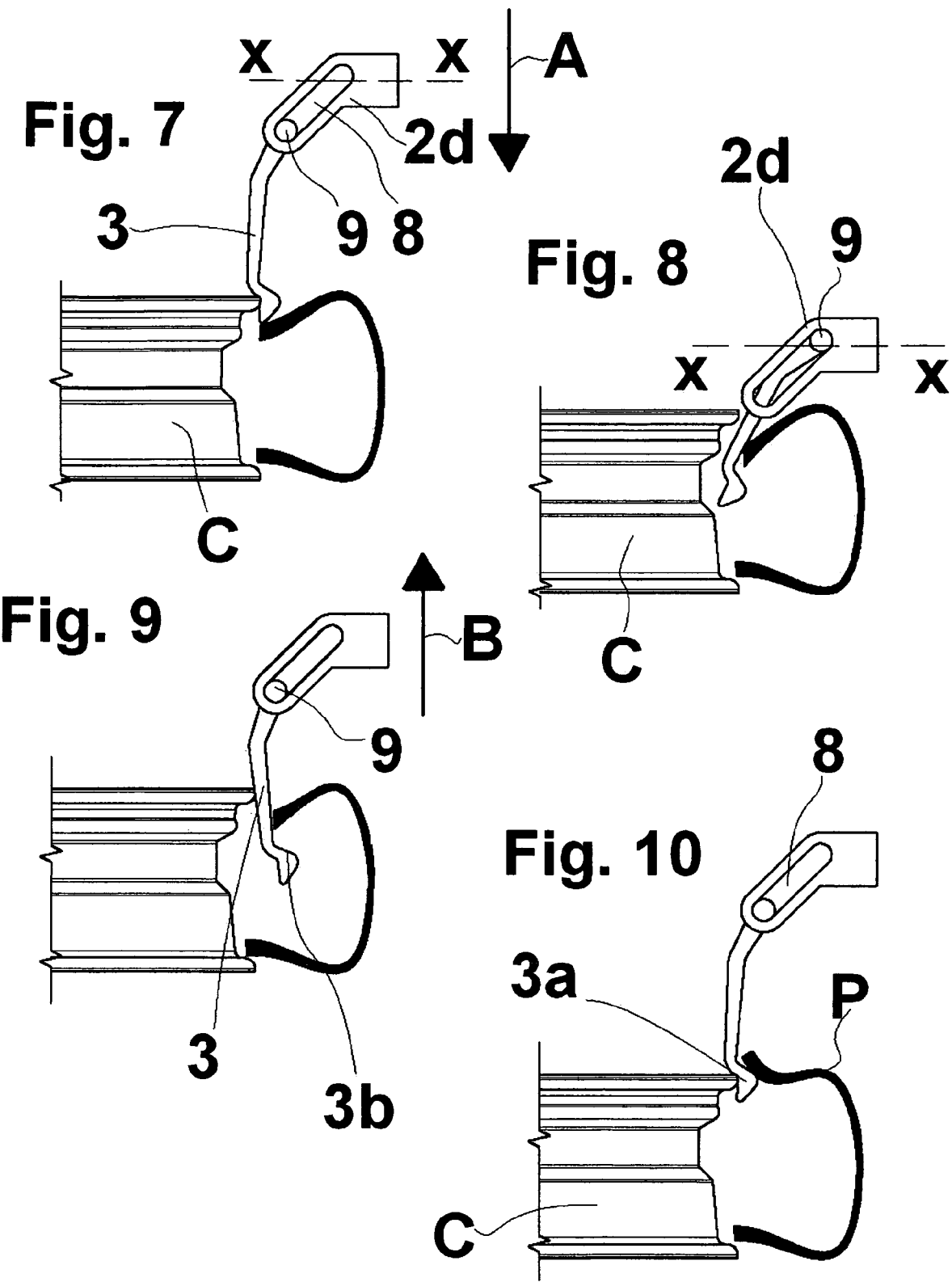

TOOL FOR AUTOMATICALLY ASSEMBLING-DISASSEMBLING A TIRE TO/FROM A WHEEL RIM

FIELD OF INVENTION

The present invention relates to a tool for automatically assembling-disassembling a tire to/from a wheel rim.

As it is known, to correctly disassemble a tire of a tired wheel from its respective wheel rim, after completion of the required bead releasing operations, it is necessary first to insert an hook-type assembling-disassembling tool into the contact area between tire and wheel rim, to drive the tool into the contact are, thereby allowing both the tire bead to be spaced from the wheel rim edge and the tool hook to be engaged with the edge of the tire bead, then to remove the tool, thus dragging with it the edge of the bead until it is extended beyond the wheel-rim edge, and finally to rotate the wheel rim or the tool to progressively force the whole tire bead beyond the wheel rim edge. Similar and easier operations in reverse sequence must be carried out in order to assemble a tire.

Such assembling-disassembling operations require, however, proper accuracy of execution to prevent the wheel rim (which is often made of a light metal alloy) and the tire from becoming damaged or simply scratched.

BACKGROUND OF INVENTION

A multiplicity of assembling-disassembling techniques have been suggested and extensive studies and searches have been carried out over time to find a solution to this problem.

Thus, for example, patent IT-1 319 475 describes a tire assembling-disassembling machine provided with rotatable means for supporting a wheel rim, and an automatic device for assembling-disassembling a tire. Such an automatic device has a arm extending cantileverwise, which can move both radially and axially with respect to a wheel rim arranged on the rotatable supporting means, that supports a hook-type assembling tool at its free end, the assembling tool being articulated at its head thereby extending transversally with respect to the arm. The assembling tool can be controlled to effect angular movements about its axis of rotation by a linkage system controlled by a double-acting jack. At the beginning, the tool is located in a lifted position and is lowered by the supporting arm until its hook end contacts the area between tire and wheel rim, and the tire bead is pressed downwards. At the same time, the tool is rotated about its articulation pin through an angle $\alpha$ in the direction in which its free hook-type end moves closer to the wheel rim. Such a rotation assist the tire bead in being hooked by the hook-type end of the tool. At this point, the tool-carrying arm is caused to move upwards, and thus the tool moves with it the tire bead until it is extended beyond the wheel rim edge. The wheel rim is then set in rotation so that the tire bead is progressively carried outside the wheel rim edge, while sliding along the hook portion of the tool. If desired, in this latter step, the tool can be rotated through an angle $\beta$ in the direction in which the hook edge moves away from the wheel rim thereby assisting in the bead extraction. In all disassembling steps has its hook back of the tool is facing the wheel rim, whereas the hook portion proper is facing the tire. The tool, however, is not free, but it is driven and held firmly in position during all the steps needed for disassembling the tire from its control linkage.

Obviously, such a technical solution, on the one hand, is very expensive to be carried out and, on the other, requires a skilled operator in order to avoid damaging the wheel rim and/or the tire during the assembling-disassembling steps.

Patent Application No. US-2004/0 055 712 discloses a particular embodiment of an assembling-disassembling tool fully similar to that described in IT-1 319 475.

Patent EP-1 459 913 discloses a tire assembling-disassembling machine provided with a rotatable wheel-carrying table, which can be moved near to, or away from, a rear support upright, and a tire assembling-disassembling device. The assembling-disassembling device is supported by a sleeve slidable along a guide member parallel to the support upright. An ear of a tool-carrying bush is articulated to the sleeve, the tool being formed by a rod iron with a hook-shaped end which is mounted for rotation in the bush and can be controlled by a double-acting jack so that it can effect angular movements about the axis of the bush. The tool is first moved against to the area between bead and wheel rim edge, with its hook-shaped end being tangentially directed with respect to the wheel rim, it is then driven beyond the tire edge, the tool is caused to rotate through about 90° to allow the hook-shaped end thereof to climb over and engage with the edge of the tire bead, and finally a tire edge portion is extracted and the wheel is subsequently caused to rotate.

Also this assembling-disassembling tool then requires an operation by means of mechanisms controlled by an operator and this, on one hand, results in considerable costs for the tool adjusting and control system, and on the other mistakes are likely to occur owing to a wrong evaluation of the trim (especially the inclination) of the tool with respect to the wheel rim or the tire, which might result in the tool stumbling in the tire edge thereby damaging it.

SUMMARY OF THE INVENTION

The main object of the present invention is to provide a tire assembling-disassembling tool on a tire assembling-disassembling machine provided with a rotatable support for a tired wheel or wheel rim, which tool makes it possible to assemble-disassemble a tire with no manual operations by an operator except the positioning of the wheel onto the rotatable support and the tool adjustment.

Another object of the present invention is to provide a tire assembling-disassembling tool very simple to manufacture and use which does not require any dead times as required with manual intervention of the operator, apart from manual intervention during the starting step.

Another object of the present invention is to provide a tire assembling-disassembling tool obtainable at competitive production costs.

According to a first aspect of the present invention, there is provided a tire assembling-disassembling tool for use with a tire assembling-disassembling machine arranged rotatably to support a tired wheel or wheel rim, said tool being supported cantileverwise on a respective guide member of the tire assembling-disassembling machine, said tool extending parallel to the axis of rotation of the wheel and comprising a tool-carrying arm which is slidably mounted on said guide member, and at least one nail-shaped member having a first end thereof constrained to said tool-carrying arm, so that it can effect roto-translational movements with respect thereto, and its other free end is hook-shaped and has its back facing said wheel rim.

Advantageously, at its first end, said nail-shaped member is articulated in at least one recess or slot formed in said tool-carrying arm, said recess or slot extending in an inclined direction with respect to both the axis of the tool-carrying arm and a direction perpendicular thereto.

Preferably, at said its first end, said nail-shaped member is articulated to an end of a link or shackle member, whose other end is articulated to said tool-carrying arm.

According to another aspect of the present invention, there is provided a tire assembling-disassembling machine comprising at least one assembling-disassembling tool as described above.

Advantageously, such a tire assembling-disassembling machine also comprises at least one pair of bead-releasing rollers, which are arranged, in use, on opposite sides with respect to a wheel rim or tired wheel placed on said machine, and uprights sliding parallel to the axis of a wheel rim or tired wheel, but along two directions parallel and spaced apart a predetermined distance.

BRIEF DESCRIPTION OF THE DRAWINGS

Further features and advantages of the present invention will better appear from the following detailed description of some presently preferred embodiments thereof, given with reference to the accompanying drawings, in which:

FIGS. 2 to 6 show the sequence of the tire disassembling steps from a wheel rim by means of a tool structured in accordance with a first embodiment thereof;

FIGS. 7 to 10 show the sequence of the tire disassembling steps from a wheel rim by means of a tool structured in accordance with another embodiment thereof.

EMBODIMENTS OF THE INVENTION

Figure 1:
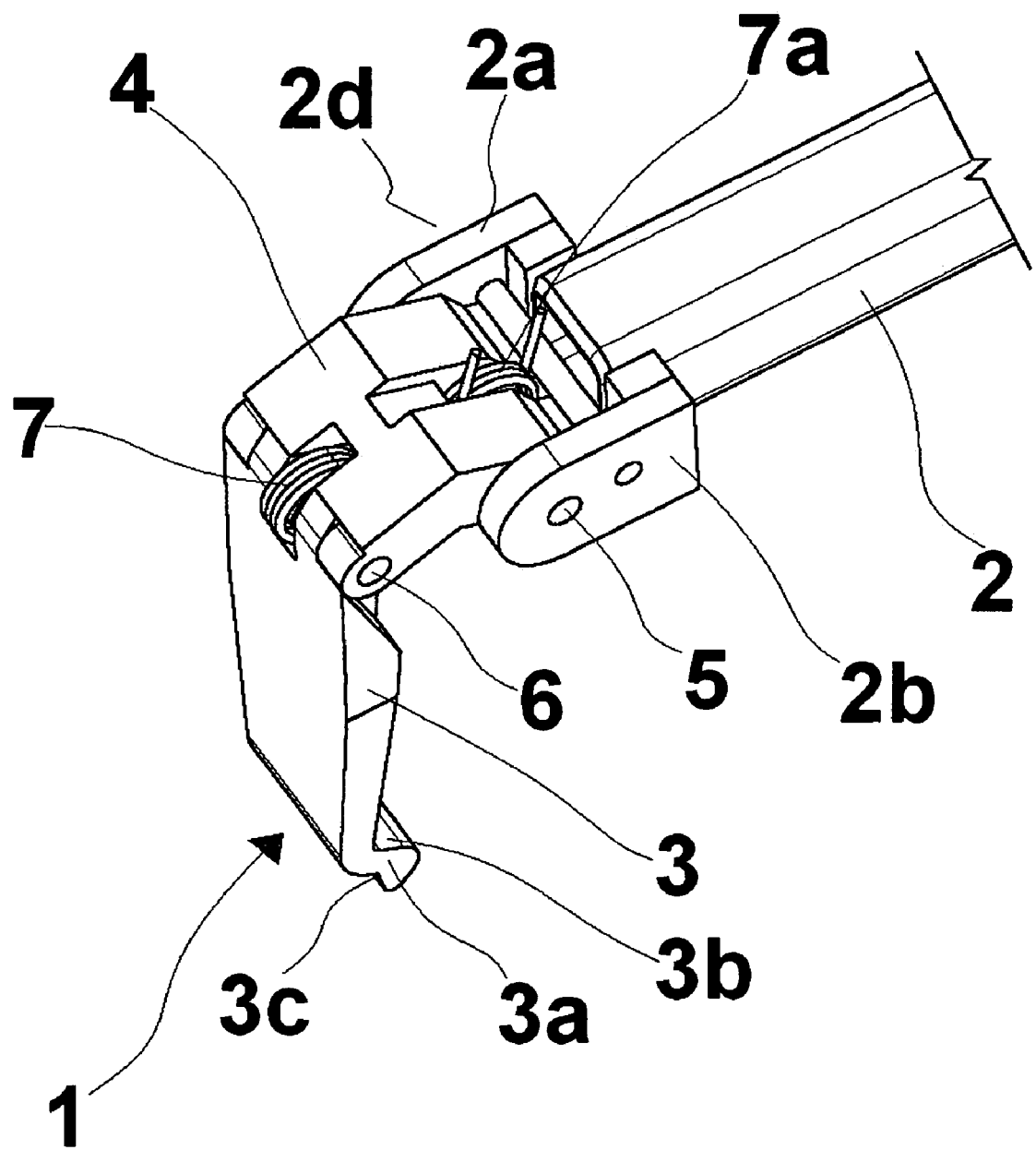
FIG. 1 is a perspective view slightly from above which illustrates a tire assembling-disassembling machine tool according the present invention.

In the accompanying drawings the same or similar parts or components are indicated with the same reference numerals.

Figure 11:
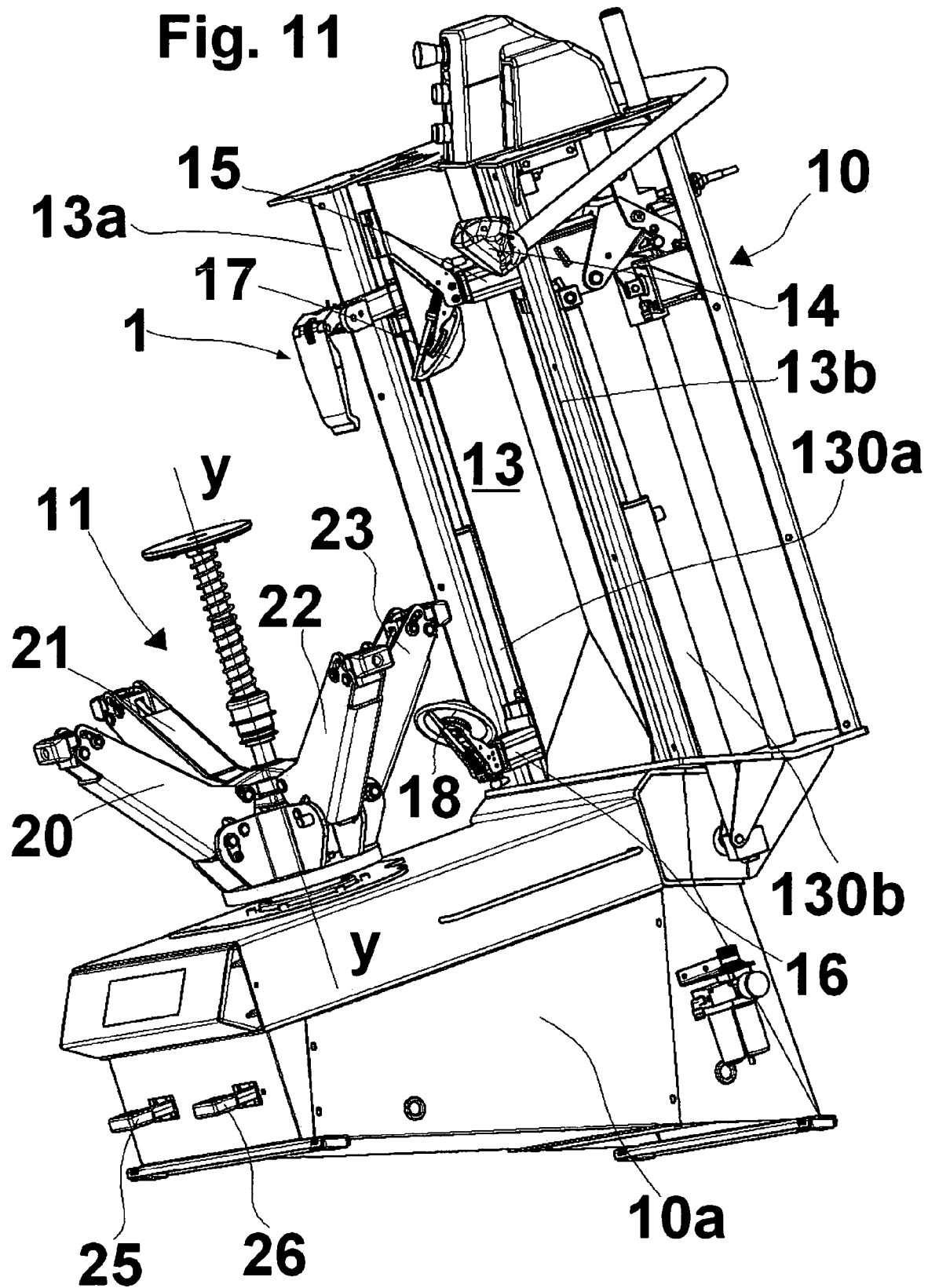
FIG. 11 is a perspective side view slightly from below which illustrates a tire assembling-disassembling machine provided with both a tire assembling-disassembling tool and a pair of opposite bead-releasing rollers arranged offset with respect to one to another.

With reference first to FIGS. 1 to 6 and 11, there is illustrated a tool, generally designed with the reference numeral 1, for assembling-disassembling a tire P, comprising a tool-carrying arm 2 supported in a radial direction with respect to the tire at one end thereof by means of a side guide 13a provided in a tire assembling-disassembling machine with respect to which it can translate in a direction substantially parallel to the axis y-y of the tire in FIG. 11, as further explained below. The arm 2 at its other end is fork-shaped and has its tines shaped as two side plates 2a and 2b extending parallel to the arm 2. Moreover, the fork 2 is articulated to a nail-shaped member 3 through a shackle member 4, which, in turn, is articulated to the two side plates 2a and 2b of the fork 2d at one end 5 thereof, and to one end of the nail-shaped member 3 at its other end 6.

The nail-shaped member 3 is substantially plate-like shaped and has its other (free) end substantially hook-shaped and terminating with a cross length 3a arranged to delimit together with the plate-like portion both an inner recess 3b facing, in use, the tool-carrying arm 2, and an outer groove 3c facing away from the recess 3b.

A respective resilient contrast spring 7 and 7a is provided between nail-shaped member 3 and shackle member 4, and between the shackle member and tool-carrying arm 2. Such springs are suitable for holding the nail-shaped member 3 in a substantially normal trim with respect to arm 2, whereas the shackle member 4 is held substantially aligned with the arm itself, and act as return members after each trim change, as further described below.

The tool 1 can be made of any suitable material, preferably an anti-friction plastics material, e.g. nylon (registered TM), which is advantageously reinforced with reinforcing fiber or frameworks, e.g. glass fibers.

After the bead of a tire P has been released, e.g. by means of bead-releasing rollers 17 and 18, from a respective wheel rim C, during a first step of tire disassembling process, the tool 1 is caused to abut, at the outer groove 3c of its free end 3a (FIG. 2) against the wheel rim C at a contact area between wheel rim edge and tire bead by suitably lowering the tool-carrying arm 2; then, while continuing lowering of tool-carrying arm 2 (FIG. 3), as shown by arrow A, the end 3a of the nail-shaped member is inserted between bead and tire edge, until the tire bead is engaged by the nail at the inner recess 3b of the hook-shaped end 3c (FIG. 4). During these steps, the nail 3 in contact with the wheel rim always still at its outer groove rotates about the pin 6 in a such a direction that the end 3a moves near the wheel rim, whereas the shackle member 4 rotates about the pin 5 in the same direction of rotation as that of the nail, thus changing from a substantially horizontal configuration to a substantially vertical configuration. Such a double rotation essentially results in a roto-translational movement of the nail 3 with respect to the tool-carrying arm 2.

At this point, the tool-carrying arm 2 is pushed upwards, which results (arrow B, FIG. 5) in the end of shackle member 4, which is pivoted to the tool-carrying arm 2, being rotated and lifted, and in the end of shackle member 4, which is pivoted to nail 3, being caused to rotate and translate. As a consequence of these movements, the nail 3, on one hand, pivoted to the shackle member 4 and, on the other, in contact with the wheel rim edge is caused to perform one rotation in such a direction as to cause the end 3a to move away from the wheel rim and to reach again a position substantially parallel to the axis y-y of wheel.

Thus, while continuing to move the arm 2 upwards, the shackle member 4 is carried to a balance position controlled by the spring 7a with respect to the arm 2, and any further upward movement of the arm 2 will result in the shackle member 4, and consequently the nail 3, being moved upwards, the nail 3 dragging the tire bead to a position (FIG. 6) in which it is outside the tire edge, whereas the free end 3a of the nail 3 slidably engages the adjacent edge of the wheel rim at its outer groove 3c.

At this point, it will be sufficient to cause the wheel rim or the tool 1 to rotate, thereby carrying the whole tire bead above the wheel rim.

With reference now to the embodiment illustrated in FIGS. 7 to 10, there is shown a device according to the present invention, comprising a tool-carrying arm 2 having its fork-shaped end 2d, in which a pair of opposite slots 8 are formed extending according to a inclined direction (e.g. 45°) with respect to the axis x-x of the tool-carrying arm. A pin 9 can freely slide in these slots. To such a pin a nail-shaped member 3 precisely similar that described above has been previously pivoted.

The operation of such a tool is similar to that described with reference to FIGS. 1 to 6, as the tool-carrying arm 2, during its downward movement, moves the nail 3 in contact with the wheel rim at the contact area between the wheel rim-tire and the outer groove 3c of the hook end 3a in contact with the wheel rim, then any further downward movement of the arm 2 causes the nail 3 to become inserted between tire bead and tire edge and at the same time it is inclined in a direction in which its end 3a comes nearer to the inner central band of the wheel rim owing to the sliding movement of the pin 9 along the inclined slots 8 (FIG. 8).

At this point, the arm 2 is caused to move backwards along its guide 13a, whereby a change in the trim of the nail 3 is obtained, the nail taking a trim almost parallel to the axis y-y of the wheel, and, while the backward movement of the arm continues, engaging at the hook-shaped end 3a thereof with the bead inner side until its groove 3c is moved onto the wheel rim edge (FIG. 10), in which position the tire bead is locally carried outside the wheel rim.

To complete the tire disassembling, it is then sufficient to set the wheel or the tool in rotation.

With specific reference to the tire assembling-disassembling machine 10 in FIG. 11 provided with the above described tool 1, it will be noted that from a base generally indicated at 10a a self-centering device 11 raises having expansion arms 20 to 23 for rotatably supporting a wheel rim about the axis y-y onto which a tire is to be assembled, or a tired wheel from which a respective tire is to be disassembled. The machine 10 is also provided with a pair of bead releasing rollers 17 and 18, one of which 18 is slidably mounted along a guide 13a, the tool-carrying arm 2 being slidable thereon, whereas the other roller 17 is slidably mounted on a guide 13b parallel to the guide 13a, the guides being attached to an upright or rear column 13 of the machine usually provided in an assembling-disassembling machine.

It will be noted that the tool-carrying arm can be controlled by a double-acting jack 130a, whereas the bead releasing rollers 17 and 18 are controlled to slide along respective sliding guides by means of a respective double-acting jack 130b (only one being shown in FIG. 11).

The specific characteristic of the bead releasing roller system 17 and 18 is that the rollers are mounted offset with respect to the rotatable self-centering device 11, i.e. they are located on opposite sides with respect to a wheel rim-tire assembly, as they are slidably mounted on guides 13a and 13b parallel but displaced of a prescribed distance from one another, so as to be located and act, in use, on opposite beads of a tire, but on opposite sides with respect to the nail 3.

A control lever 14 is also constrained to the column 13 and provided with a knob carrying a control push-bottom panel and two pedals 25 and 26 arranged in the base, as is known in the art.

Advantageously, the bead releasing rollers are cantileverwise supported by means of supporting telescopic arms 15 and 16, which automatically expand and contract according to the various diameters of the wheels on which to act.

An assembling operation of a tire onto a wheel rim is carried out in a similar way partly acting in reverse order.

Thus, an assembling-disassembling device according to the present invention does not require a particularly skilled operator. As a matter of fact, it is sufficient for the operator to place the tire onto the machine and then adjust the tool-carrying arm so that the tool is placed just above the contact area between tire and wheel rim and the outer groove 3c is located at the wheel rim edge. At this point, it is sufficient to control the tool-carrying arm to move downwards until the nail engages with the tire bead at the inner recess, then to control the tool-carrying arm to move upwards to carry the tire bead above the wheel rim edge. All these operations can be carried out in a completely automatic way by means of a suitable software and a programmable control unit that can be located either in the base or the column of the machine.

Thus, it is not necessary to control the inclination of nail 3 during the various disassembling steps, which makes it possible a safely and rapid disassembling without damaging the wheel rim or the tire, by carrying out roto-translational and inclined movements imposed by the specific tool construction. During all the steps required for disassembling a tire, the nail 3 remains in contact with a tire portion at the outer groove 3c and the inclination of the end 3a in the direction of approaching the wheel rim required for the nail 3 to engage the tire bead occurs automatically through a roto-translation movement of the nail 3 with respect to the tool-carrying arm, as shown in the embodiment of FIGS. 2 to 6, where such a roto-translation movement is assured by rotation of the shackle member 4 and rotation and translation of the nail. In the embodiment of FIGS. 7 to 10 this is achieved through a translation movement of the pin 9 inside the slot 8, and consequent rotation of the nail and approach of the end 3a to the end of the tool-carrying arm 2.

The tire assembling-disassembling tool, as well as the tire assembling-disassembling machine as described above are susceptible of numerous modifications and changes within the scope as defined by the claims.

Thus for example the tool-carrying arm 2 can be telescopic with automatic expansion/contraction movements to be adapted to various tired-wheel diameters.

The invention claimed is:

1. A tire assembling-disassembling machine comprising a support base arranged to support a tired wheel or wheel rim and to cause its rotation about an axis of rotation, at least one guide member extending substantially parallel to said axis of rotation upwards from said support, a tool-carrying arm which is slidably mounted on said guide member, and a plate like tool member having one free end thereof, said machine comprising constrain means designed to articulate on end of said plate-like tool member to said tool-carrying arm, thereby allowing rotational and translational movements of said tool member with respect to said tool-carrying arm as a function of a force applied to said tool member, said free end of said tool member being provided with a back facing said wheel rim.

2. A machine as claimed in claim 1, wherein said constrain means comprises resiliently yielding contrast means between said tool-carrying arm and said tool member.

3. A machine as claimed in claim 1, wherein said tool member is articulated at said first end thereof within at least one recess or slot formed in said tool-carrying arm.

4. A machine as claimed in claim 3, wherein said at least one recess or slot extends in a direction inclined with respect to both the axis of said tool-carrying arm and a direction perpendicular thereto.

5. A machine as claimed in claim 3, wherein said tool-carrying arm is supported by said guide member at one end thereof, and terminates at its other end with a fork-shaped member for articulated connection to said tool member.

6. A machine as claimed in claim 1, wherein said tool member at said first end thereof is articulated to an end of a shackle member, whose other end is articulated to said tool-carrying arm.

7. A machine as claimed in claim 6, wherein said resiliently yielding means is provided between said tool member and said shackle member, and between said shackle member and said tool-carrying, thereby holding said tool in its rest position oriented substantially parallel to the axis of rotation of said wheel rim.

8. A machine as claimed in claim 7, wherein said resiliently yielding means comprises at least one spring.

9. A machine as claimed in claim 6, wherein said tool-carrying arm is cantileverwise supported by said guide member at one end thereof, whereas at its other end it terminates with a fork member for articulated connection to said shackle member.

10. A machine as claimed in claim 1, wherein said free end of said tool member terminates with a transversal length suitable for delimitating an inner recess facing, in use, said tool-carrying arm, and an outer groove facing away from said recess.

11. A machine as claimed in claim 10, wherein said inner recess is designed to engage and extract, in use, an edge of a tire bead from a respective wheel rim.

12. A machine as claimed in claim 10, wherein said outer groove is designed to slidably rest on a wheel rim edge.

13. A machine as claimed in claim 1, wherein said tool member is made of a suitable anti-friction plastics material.

14. A tire assembling-disassembling machine as claimed in claim 1, comprising at least one pair of bead-releasing rollers arranged, in use, on opposite sides with respect to a wheel rim or tired wheel placed on said machine, and uprights which slide parallel to the axis of rotation of said wheel rim or tyred wheel along two directions parallel to, and spaced from, one another of a predetermined distance.

* * * * *